(12) United States Patent
Lin et al.

(10) Patent No.: US 11,469,648 B2
(45) Date of Patent: Oct. 11, 2022

(54) MOTOR, POWER UNIT, AND BULLDOZER

(71) Applicant: Nidec Corporation, Kyoto (JP)

(72) Inventors: Hsin-Nan Lin, Taipei (TW); Guo-Jhih Yan, Taipei (TW); Sheng-Chan Yen, Taipei (TW); Yu-Wei Hsu, Taipei (TW); Kuo-Min Wang, Taipei (TW); Cheng-Tsung Liu, Kaohsiung (TW)

(73) Assignee: Nidec Corporation, Kyoto (JP)

( * ) Notice: Subject to any disclaimer, the term of this patent is extended or adjusted under 35 U.S.C. 154(b) by 721 days.

(21) Appl. No.: 16/477,223

(22) PCT Filed: Feb. 19, 2018

(86) PCT No.: PCT/JP2018/005659
§ 371 (c)(1),
(2) Date: Jul. 11, 2019

(87) PCT Pub. No.: WO2018/159349
PCT Pub. Date: Sep. 7, 2018

(65) Prior Publication Data
US 2019/0372427 A1    Dec. 5, 2019

(30) Foreign Application Priority Data
Feb. 28, 2017    (CN) .......................... 201710112915.5

(51) Int. Cl.
*H02K 11/01*    (2016.01)
*E02F 3/76*    (2006.01)
(Continued)

(52) U.S. Cl.
CPC .......... *H02K 11/012* (2020.08); *E02F 3/7609* (2013.01); *E02F 3/84* (2013.01);
(Continued)

(58) Field of Classification Search
CPC .... H02K 11/012; H02K 7/04; H02K 2201/03; H02K 2213/03; E02F 3/7609; E02F 3/84; E02F 3/844; E02F 9/02; E02F 9/20
(Continued)

(56) References Cited

U.S. PATENT DOCUMENTS 6,769,167 B2    8/2004    Lee et al.
7,635,933 B2 *  12/2009    Makino .............. H02K 15/0068
                                                310/68 B
(Continued)

FOREIGN PATENT DOCUMENTS

JP    62-002839 A    1/1987
JP    10-108396 A    4/1998
(Continued)

OTHER PUBLICATIONS

Official Communication issued in International Patent Application No. PCT/JP2018/005659, dated May 15, 2018.

*Primary Examiner* — Maged M Almawri
(74) *Attorney, Agent, or Firm* — Keating & Bennett

(57) ABSTRACT

A motor includes a rotor including a rotating shaft extending along a center axis, a cylindrical rotor core provided outside the rotating shaft in a radial direction, and two discoid weight plates provided at two ends of the cylindrical rotor core in an axial direction, and a stator opposing the rotor in the radial direction. A radius of each weight plate is smaller than a radius of the rotor core, and a difference between the radius of the rotor core and the radius of each weight plate is larger than an air gap between an outside of the rotor core in the radial direction and an inside of the stator in the radial direction.

5 Claims, 2 Drawing Sheets

(51) Int. Cl.
*E02F 3/84* (2006.01)
*E02F 9/02* (2006.01)
*E02F 9/20* (2006.01)
*H02K 7/04* (2006.01)

(52) U.S. Cl.
CPC .............. *E02F 3/844* (2013.01); *E02F 9/02* (2013.01); *E02F 9/20* (2013.01); *H02K 7/04* (2013.01); *H02K 2201/03* (2013.01); *H02K 2213/03* (2013.01)

(58) Field of Classification Search
USPC .................................................. 310/216.001
See application file for complete search history.

(56) References Cited

U.S. PATENT DOCUMENTS

| | | | | |
|---|---|---|---|---|
| 7,654,792 | B2 * | 2/2010 | Kikuichi | F04D 29/601 415/214.1 |
| 7,988,810 | B2 * | 8/2011 | Tamaoka | F16C 17/107 156/321 |
| 8,276,255 | B2 | 10/2012 | Leachman et al. | |
| 8,599,517 | B1 * | 12/2013 | Abe | G11B 19/2009 360/99.08 |
| 8,659,850 | B2 * | 2/2014 | Himeno | G11B 25/043 310/90 |
| 8,693,138 | B2 * | 4/2014 | Saeki | G11B 19/2009 310/71 |
| 8,737,017 | B1 * | 5/2014 | Abe | H02K 21/22 360/99.08 |
| 8,873,196 | B2 * | 10/2014 | Masumi | H02K 11/33 360/99.08 |
| 8,873,198 | B1 * | 10/2014 | Iwasaki | F16C 17/107 360/99.08 |
| 8,941,946 | B2 * | 1/2015 | Sekii | G11B 19/2036 310/90 |
| 9,001,461 | B1 * | 4/2015 | Yawata | G11B 19/2009 360/99.08 |
| 9,088,191 | B2 * | 7/2015 | Yokogawa | H02K 3/522 |
| 9,140,268 | B2 * | 9/2015 | Teshima | F16C 33/74 |
| 9,190,880 | B2 * | 11/2015 | Sugi | F16C 33/74 |
| 9,458,852 | B2 * | 10/2016 | Yoo | F04D 29/667 |
| 9,721,608 | B2 * | 8/2017 | Takahashi | H02K 5/1677 |
| 9,800,118 | B2 * | 10/2017 | Iwai | H02K 1/2786 |
| 9,812,163 | B2 * | 11/2017 | Yoneda | G11B 19/2009 |
| 9,876,409 | B2 * | 1/2018 | Kajiyama | H02K 5/15 |
| 9,886,984 | B2 * | 2/2018 | Akagi | G11B 25/043 |
| 9,973,048 | B2 * | 5/2018 | Kawamoto | H02K 1/2773 |
| 10,079,519 | B2 * | 9/2018 | Hamagishi | H02K 5/148 |
| 10,505,408 | B2 * | 12/2019 | Nakahara | H02K 15/022 |
| 2014/0152141 | A1 * | 6/2014 | Saitou | H02K 3/50 310/214 |
| 2019/0036401 | A1 * | 1/2019 | Takano | H02K 15/03 |

FOREIGN PATENT DOCUMENTS

| | | |
|---|---|---|
| JP | 2000-078786 A | 3/2000 |
| JP | 3517319 B2 | 4/2004 |
| JP | 2005-304177 A | 10/2005 |
| JP | 2009-136090 A | 6/2009 |
| JP | 2009-177861 A | 8/2009 |
| JP | 2012-235652 A | 11/2012 |

* cited by examiner

MOTOR, POWER UNIT, AND BULLDOZER

CROSS REFERENCE TO RELATED APPLICATIONS

This is the U.S. national stage of PCT Application No. PCT/JP2018/005659, filed on Feb. 19, 2018, and priority under 35 U.S.C. § 119(a) and 35 U.S.C. § 365(b) is claimed from Chinese Application No. 201710112915.5, filed Feb. 28, 2017; the entire disclosures of each application being hereby incorporated herein by reference.

1. FIELD OF THE INVENTION

The present disclosure relates to the field of motors and, in particular, relates to a motor, a power unit, and a bulldozer.

2. BACKGROUND

In a known motor, a synchronous reluctance motor provided with a stator and a rotor is known. The rotor includes a rotor core. A single end plate that fixes the rotor core is provided at each of the two ends of the rotor core. In order to fix the rotor core, the end plates are desirably metal members. However, since the metal members, together with the rotor, connect to the magnetic flux generated from the stator, iron loss occurs.

As a method of improving excess iron loss, there is a method of changing the material of the end plates to a non-metallic material and assembling the end plates between the rotor core in a distributed manner. However, with the above, the function regarding the dynamic balance becomes lost and the magnetically permeable space inside the rotor core becomes occupied.

SUMMARY

In an example embodiment of the present disclosure, a motor includes a rotor and a stator. The rotor includes a rotating shaft extending along a center axis, a cylindrical rotor core provided outside the rotating shaft in a radial direction, and two discoid weight plates provided at two ends of the rotor core in an axial direction. The stator is disposed to oppose the rotor in the radial direction. A radius of each weight plate is smaller than a radius of the rotor core, and a difference between the radius of the rotor core and the radius of each weight plate is larger than an air gap between an outside of the rotor core in the radial direction and an inside of the stator in the radial direction.

In an example embodiment of the present disclosure, magnetic insulation sheets are provided between the weight plates and the rotor core, and a radius A of the rotor core, a radius B of each weight plate, a height $h_3$ of each weight plate in the axial direction, a height $h_2$ of each magnetic insulation sheet in the axial direction, and the air gap g satisfy the following relationship:

$$A - B > \left(\frac{h_3}{h_2}\right) * g$$

while $$h_3 > h_2,$$

is satisfied.

In an example embodiment of the present disclosure, a height R of the rotor core in the axial direction, the height $h_2$ of each magnetic insulation sheet in the axial direction, and a height S of the stator in the axial direction satisfy the following relationship:

$$R + h_2 > S.$$

In an example embodiment of the present disclosure, a coil is wound around the stator, and the radius A of the rotor core, the radius B of each weight plate, the height $h_2$ of each magnetic insulation sheet in the axial direction, a height $h_1$ of a portion of the coil exposed from the stator in the axial direction, and the air gap g satisfies the following relationship:

$$A - B < \frac{h_2}{h_1} * (A + g)$$

In an example embodiment of the present disclosure, a power unit includes either of the motors described above.

In an example embodiment of the present disclosure, a bulldozer includes a caterpillar and a power shovel, and further includes a power unit described above that supplies motive power to the caterpillar and the power shovel.

Referring to the drawings and the description described below, specific example embodiments of the present disclosure will be disclosed in detail, illustrating that the principles of the present disclosure are used. It should be understood that the present disclosure is not limited to the scope of the example embodiments described below. Within the spirit of the appended claims and within the scope of the claims, the example embodiments of the present disclosure include various changes, modifications, and equivalents.

The features described and/or illustrated in one example embodiment may be used in one or more other example embodiments in a similar or in a resembling manner, and may be combined with the other example embodiments or the feature of the other example embodiments may be switched.

It should be noted that the technical term "provided with/including" is used in the present document to illustrate the presence of a feature, a body portion, a step, or a member; however, an addition of the presence of one or more of the other features, body parts, steps, or members is not excluded.

The above and other elements, features, steps, characteristics and advantages of the present disclosure will become more apparent from the following detailed description of the example embodiments with reference to the attached drawings.

BRIEF DESCRIPTION OF THE DRAWINGS

The accompanying drawings are provided to further facilitate understanding of the examples of the present disclosure and constitute a part of the specification. The accompanying drawings exemplify preferred example embodiments of the present disclosure and, together with the written text, describes the principles of the present disclosure. Apparently, the attached drawings described later are merely a few examples of the present disclosure. On the premises that those skilled in the art do not put in a creative effort, other attached drawings can be obtained based on the attached drawings.

DETAILED DESCRIPTION

Figure 1:
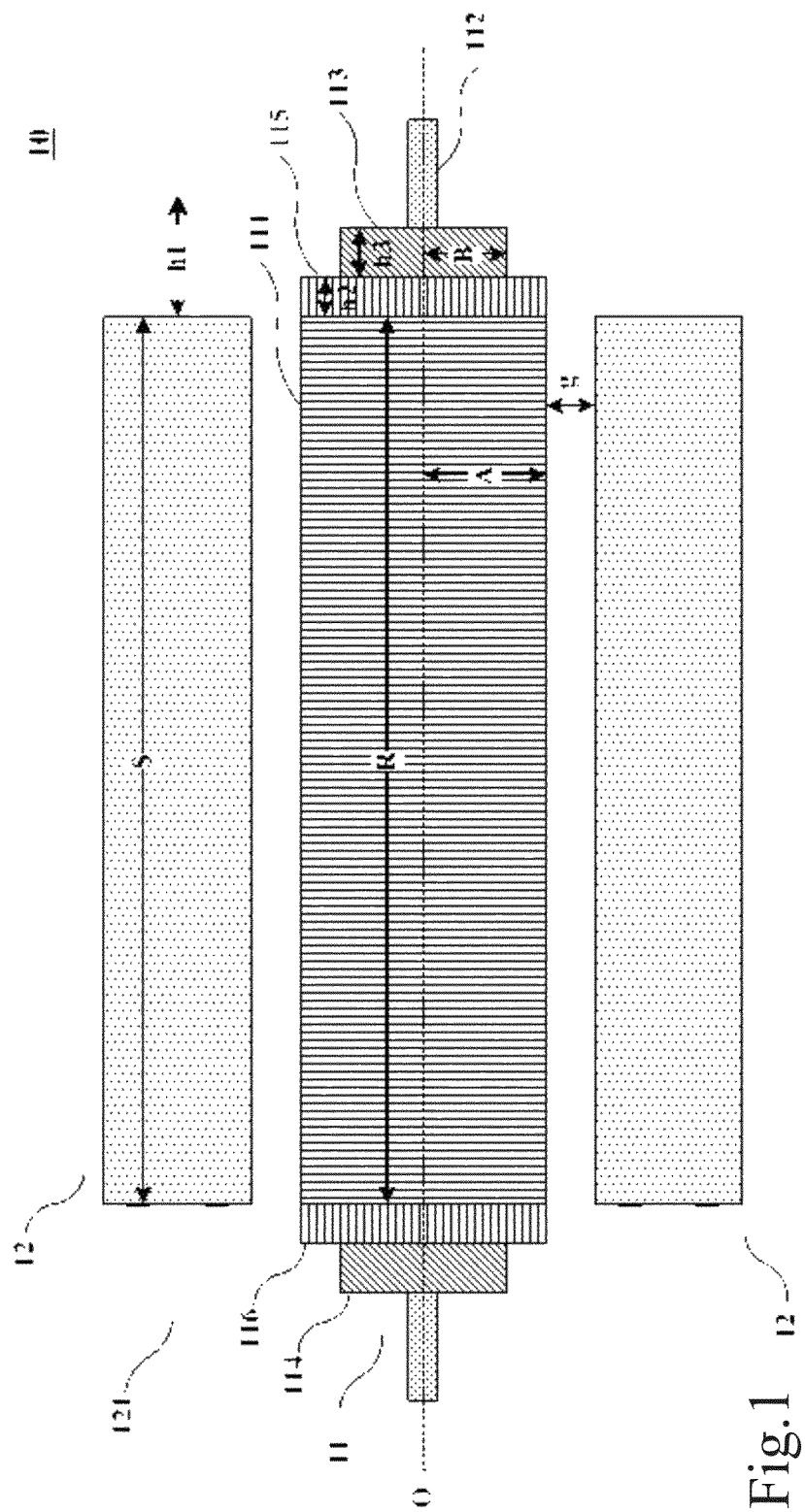
FIG. 1 is a schematic view of a portion of a motor according to an example embodiment of the present disclosure viewed from the side.

Referring to the drawings and with the specification described below, the features described above and other features of examples embodiments of the present disclosure will be made more clear. Specific example embodiments of the present disclosure will be disclosed in a specific manner through the specification and the drawings and some of the example embodiments capable of adopting the principle of the present disclosure will be illustrated; however, it is to be understood that the present disclosure is not limited to the described example embodiments. On the other hand, the present disclosure includes all revisions, modifications, and equivalents pertaining within the scope of the attached claims.

In the known art, the output characteristics of the motor can be changed by changing the shape of the magnetic flux barrier. However, with such a method, all the steel plates of the rotor core need to be newly manufactured for the required output characteristics; accordingly, a new cost will be incurred. Alternatively, a core having a different structure may be used to improve the output characteristics of the motor; however, in terms of manufacturing and assembling, it is relatively difficult and the manufacturing cost may be further higher. Furthermore, neither of the methods improving the known art take the iron loss generated on the weight plates into account; accordingly, the efficiency of the motor is limited by the iron loss on the weight plates at all times, and improvement in the efficiency of the overall motor cannot be made further.

The examples of the present disclosure provides a motor, a power unit, and a bulldozer to simultaneously overcome the problems described above. In the present specification, a direction parallel to a direction extending along a center axis is referred to as an "axial direction", a radial direction about the central axis is referred to as a "radial direction", and a circumferential direction about the center axis is referred to as a "circumferential direction". It should be noted that the definitions of the directions in the present specification are for the sake of describing the examples of the present disclosure and do not limit the direction of use and the direction during manufacturing the motor.

Figure 2:
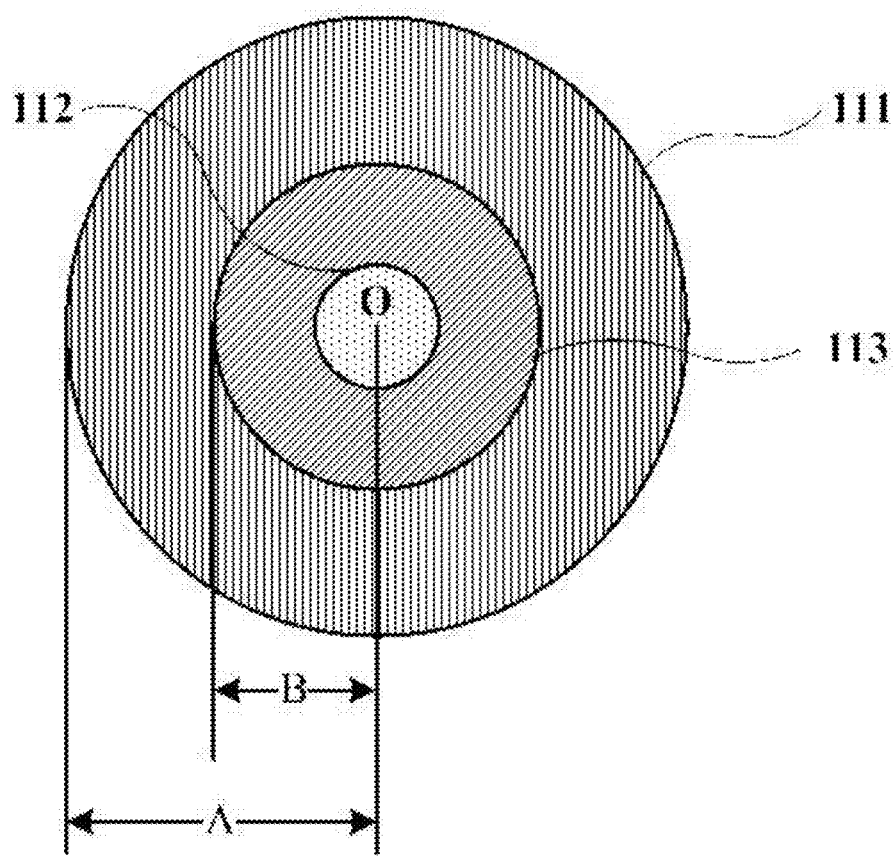
FIG. 2 is a schematic view of a size relationship between a radius of a rotor core of the motor and a radius of a weight plate according to an example embodiment of the present disclosure.

First Example: A motor is provided as an example of the present disclosure, and FIG. 1 is a schematic view of a portion of the motor viewed from the side. FIG. 2 is a schematic view of a size relationship between a radius of a rotor core of the motor and a radius of a weight plate.

As illustrated in FIG. 1, a motor 10 includes a rotor 11 and stators 12. The rotor 11 includes a rotating shaft 112 extending along a center axis O, a cylindrical rotor core 111 provided outside the rotating shaft 112 in the radial direction, and two discoid weight plates 113 and 114 provided at two ends of the cylindrical rotor core 111 in the axial direction. In other words, the rotor core 111 is disposed between the weight plate 113 positioned on one side in the axial direction and the weight plate 114 positioned on the other side in the axial direction. The stators 12 are disposed so as to oppose the rotor 11 in the radial direction.

As illustrated in FIG. 1 and FIG. 2, in the present example, a radius B of each of the weight plates 113 and 114 is smaller than a radius A of the rotor core 111, and a difference between the radius A of the rotor core 111 and the radius B of each of the weight plates 113 and 114 is larger than an air gap g between an outer side of the rotor core 111 in the radial direction and an inner side of the stator 12 in the radial direction.

With the structure described above, regarding the magnetic leakage in which the magnetic flux generated by the coils 121 of the stators 12 does not connect to the rotor, the magnetic leakage that connects to the weight plates 113 and 114 is reduced. With the above, the iron loss on the weight plates 113 and 114 is reduced. Furthermore, the overall efficiency of the motor can be improved with a convenient method and the manufacturing cost of the motor is reduced efficiently.

In the present example, the rotor core 111 may be a laminated core formed by laminating a plurality of circular plate-shaped members. The circular plate-shaped members are circular silicon steel plates, for example, and are laminated in a direction of the center axis O in an insulated state with respect to each other. However, the present disclosure is not limited to the above, and the rotor core may be configured in another manner.

In the present example, the rotating shaft 112 penetrates through the rotor core 111 and the weight plates 113 and 114 in the axial direction. The rotor core can be fixed by providing the weight plates 113 and 114 at the two ends of the rotor core 111. The weight plates 113 and 114 may be provided so as to have a discoid shape. Furthermore, by adding balance weights on the weight plates 113 and 114 according to the scene of application and practical needs, eccentricity of the rotor can be prevented and the dynamic balance of the rotor can be stabilized.

In the present example, the weight plates 113 and 114 may be disposed so as to be in direct contact with the two ends of the rotor core 111 in the axial direction. Another member may be provided between the rotor core 111 and the weight plate 113, and between the rotor core 111 and the weight plate 114. The present disclosure does not further limit the above point.

In an example embodiment according to an example of the present disclosure, as illustrated in FIG. 1, a magnetic insulation sheet 115 positioned on one side in the axial direction may be provided between the weight plate 113 positioned on one side in the axial direction and the rotor core 111. A magnetic insulation sheet 116 positioned on the other side in the axial direction may be provided between the weight plate 114 positioned on the other side in the axial direction and the rotor core 111. The radius A of the rotor core 111, the radius B of each of the weight plates 113 and 114, a height $h_3$ of each of the weight plates 113 and 114 in the axial direction, a height $h_2$ of each of the magnetic insulation sheets 115 and 116 in the axial direction, and the air gap g may satisfy the positional relationship defined by the following expression 2.

$$A - B > \left(\frac{h_3}{h_2}\right) * g \qquad \text{(expression 2)}$$

However, $$h_3 > h_2,$$

holds true.

With expression 2 described above, the positional relationship in the axial direction and in the radial direction between the rotor core 111, the weight plates 113 and 114, the magnetic insulation sheets 115 and 116, and the stators 12 are defined, and the height $h_3$ of each of the weight plates 113 and 114 in the axial direction is larger than the height $h_2$ of the magnetic insulation sheets 115 and 116. By disposing the rotor core, the weight plates, the magnetic insulation sheets, and the stators in the above described manner, the range of the value of the radius of each weight plate is further limited, the magnetic flux of the magnetic field of the stators passing the weight plates can be further reduced, and the iron loss on the weight plates is reduced.

In the present example embodiment, the rotating shaft 112 penetrates through the rotor core 111, the magnetic insulation sheets 115 and 116, and the weight plates 113 and 114 in the axial direction. The magnetic insulation sheets 115 and 116 may be disposed in a discoidal manner, and may be installed so that the size thereof in the radial direction corresponds to the size of the rotor core 111. The magnetic insulation sheets 115 and 116 may be manufactured of an alloy material having a good magnetic shielding effect; however, the examples of the present disclosure are not limited to such a member and may be a member having a magnetic shielding effect through another form.

In an example embodiment of an example of the present disclosure, as illustrated in FIG. 1, a height R of the rotor core 111 in the axial direction, the height $h_2$ of each of the magnetic insulation sheets 115 and 116 in the axial direction, and a height S of each of the stators 12 in the axial direction may satisfy a positional relationship defined by the following expression 3.

$$R + h_2 > S. \qquad \text{(expression 3)}$$

With expression 3 described above, it is determined that the sum of the height R of the rotor core 111 in the axial direction and the height $h_2$ of each of the magnetic insulation sheets 115 and 116 in the axial direction is larger than the height S of each of the stators 12 in the axial direction. By disposing the positions of the rotor core, the magnetic insulation sheets, and the stators in the axial direction so as to satisfy expression 3 described above, the iron loss on the weight plates 113 and 114 can be further reduced and the efficiency of the motor can be improved efficiently.

As illustrated in FIG. 1, in an example embodiment of an example of the present disclosure, coils 121 are wound around the stators 12, and the radius A of the rotor core 111, the radius B of each of the weight plates 113 and 114, the height $h_2$ of each of the magnetic insulation sheets 115 and 116 in the axial direction, a height $h_1$ of a portion of each coil 121 exposed from the corresponding stator 12 in the axial direction, and the air gap g may satisfy a positional relationship determined by the following expression 4.

$$A - B < \frac{h_2}{h_1} * (A + g) \qquad \text{(expression 4)}$$

The positional relationship in the radial direction and in the axial direction between the rotor core 111, the weight plates 113 and 114, the magnetic insulation sheets 115 and 116, the stators coils 121, and the air gap g are further determined with expression 4 described above. By disposing the positional relationship of the rotor core, the weight plates, the magnetic insulation sheets, and the stators so as to satisfy the condition of expression 4 described above, the iron loss on the weight plates 113 and 114 can be further reduced and the efficiency of the motor can be improved efficiently.

In the present example embodiment, a rotating magnetic field generated with the coils 121 rotates the rotor 11; however, a coil of a different form and specification may be selected according to the scene of application and practical needs. The present application do not further limit the above point.

In the present example, the magnetic leakage that is generated by the stator coils and that connects to the weight plates is reduced by changing the radius of each weight plate. With the above, the iron loss on the weight plates is reduced and the overall efficiency of the motor is improved. Furthermore, the weight plates of the motor described in the present example can be used directly together with a known rotor core; accordingly, there is no need to newly design the shape of the magnetic flux barrier of the rotor, the remodeling cost of the motor can be reduced and, further, the performance of the motor can be improved with a convenient method.

Second Example: In an example of the present disclosure, a power unit including the motor described in the first example is further provided. Since the motor has already been described in detail in the first example, the contents thereof is omitted herein.

In the present example, the power unit may be applied to a caterpillar (a crawler) of a bulldozer and to a power shovel; however, the present disclosure is not limited to the above.

According to the motor of the power unit in the present example, the performance of the motor can be improved with a convenient method, the overall efficiency of the motor is improved and, further, the efficiency of the power unit can be improved with a convenient method.

Third Example: In an example of the present disclosure, a bulldozer including the caterpillar, the power shovel, and the power unit described in the second example is further provided. The power unit supplies motive power to the caterpillar and the power shovel.

In the present example, the power unit includes the motor described in the first example. Since the motor has already been described in detail in the first example, the contents thereof is omitted herein.

According to the bulldozer in the present example, the performance of the motor can be improved with a convenient method, the overall efficiency of the motor is improved and, further, the efficiency of the power unit in the bulldozer can be improved with a convenient method.

The present disclosure has been described above in connection with specific example embodiments. However, those skilled in the art should understand that the above descriptions are all merely illustrative and are not limitations of the scope of protection of the present disclosure. Based on the spirit and principal of the present disclosure, those skilled in the art can make various changes and modifications to the present disclosure; however, the changes and modifications are also included in the scope of the present disclosure.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising: a rotor including: a rotating shaft extending along a center axis; a cylindrical rotor core provided outside the rotating shaft in a radial direction; and two discoid weight plates provided at two ends of the cylindrical rotor core in an axial direction; and a stator opposing the rotor in the radial direction; wherein a radius of each of the weight plates is smaller than a radius of the rotor core; and a difference between the radius of the rotor core and the radius of each of the weight plates is larger than an air gap between an outside of the rotor core in the radial direction and an inside of the stator in the radial direction wherein magnetic insulation sheets between the weight plates and the rotor core; wherein a radius A of the rotor core, a radius B of each of the weight plates, a height h3 of each of the weight plates in the axial direction, a height h2 of each magnetic insulation sheet in the axial direction, and the air gap q satisfy:

$$A - B > \left(\frac{h_3}{h_2}\right) * g$$

while h3>h2.

2. The motor according to claim 1, wherein a height R of the rotor core in the axial direction, the height $h_2$ of each magnetic insulation sheet in the axial direction, and a height S of the stator in the axial direction satisfy: $R+h_2>S$.

3. The motor according to claim 1, wherein
a coil is wound around the stator; and
the radius A of the rotor core, the radius B of each weight plate, the height $h_2$ of each magnetic insulation sheet in the axial direction, a height $h_1$ of a portion of the coil exposed from the stator in the axial direction, and the air gap g satisfy:

$$A - B < \frac{h_2}{h_1} * (A + g)$$

4. A power unit comprising:
the motor according to claim 1.

5. A bulldozer comprising:
a caterpillar;
a power shovel; and
the power unit according to claim 4; wherein
that power unit supplies motive power to the caterpillar and the power shovel.

* * * * *